(12) United States Patent
Brooks

(10) Patent No.: US 10,654,505 B1
(45) Date of Patent: May 19, 2020

(54) DUMP CART WITH ENHANCED UNLOADING MECHANISM

(71) Applicant: Joseph Lafayette Brooks, Monroe, WA (US)

(72) Inventor: Joseph Lafayette Brooks, Monroe, WA (US)

( * ) Notice: Subject to any disclaimer, the term of this patent is extended or adjusted under 35 U.S.C. 154(b) by 267 days.

(21) Appl. No.: 15/962,879

(22) Filed: Apr. 25, 2018

Related U.S. Application Data

(60) Provisional application No. 62/491,081, filed on Apr. 27, 2017.

(51) Int. Cl.
  *B62B 3/08* (2006.01)
  *B62B 3/00* (2006.01)
  *B62B 3/12* (2006.01)

(52) U.S. Cl.
  CPC .............. *B62B 3/08* (2013.01); *B62B 3/001* (2013.01); *B62B 3/007* (2013.01); *B62B 3/12* (2013.01); *B62B 2203/70* (2013.01); *B62B 2301/04* (2013.01)

(58) Field of Classification Search
  CPC .......... B62B 3/08; B62B 3/007; B62B 3/001; B62B 3/12; B62B 2203/70; B62B 2301/04
  USPC ........................................................ 298/17.7
  See application file for complete search history.

(56) References Cited

U.S. PATENT DOCUMENTS

| 6,106,072 A * | 8/2000 | Lutter, Jr. ............... B60P 1/165 298/17.5 |
| 2007/0200419 A1* | 8/2007 | Pieschel ................... B60P 1/04 298/2 |
| 2017/0029003 A1* | 2/2017 | Crowley ................... B62B 3/02 |

FOREIGN PATENT DOCUMENTS

FR          3051425 A1 *  11/2017   .............. B62B 1/22

* cited by examiner

*Primary Examiner* — Pinel E Romain
(74) *Attorney, Agent, or Firm* — Plager Schack LLP; Mark H. Plager; Eric Liou

(57) ABSTRACT

A dump cart designed to unload stored items is provided. The dump cart includes a base frame assembly disposed on the ground surface, the base frame assembly having a plurality of rail members coupled together to create space between the front end and rear end, and an upper frame assembly rotatably mounted to the base frame assembly and having a compartment formed by a plurality of members connected together, the compartment positioned in space between the front end and rear end of the base frame assembly. The compartment of the upper frame assembly is rotatably adjusted to a first position facing upward and away from the ground surface to load the plurality of items therein. The compartment of the upper frame assembly is rotatably adjusted to a second position facing downward and toward the ground surface to unload the plurality of items from the compartment.

10 Claims, 4 Drawing Sheets

DUMP CART WITH ENHANCED UNLOADING MECHANISM

RELATED APPLICATION

The application claims priority to provisional patent application U.S. Ser. No. 62/491,081 filed on Apr. 27, 2017, the entire contents of which is herein incorporated by reference.

BACKGROUND

The embodiments herein relate generally to carts designed to store and transport items. More specifically, embodiments of the invention are directed to a dump cart with an enhanced unloading mechanism to improve efficiency when unloading stored items.

Carts and wheelbarrows are often used in residential or commercial properties for landscaping purposes. These carts or wheelbarrows are designed with a compartment to haul items such as gravel, soil, grains, rocks, bricks, stones, leaves, branches, and the like.

However, these vehicles have several disadvantages. Specifically, wheelbarrows and carts are often difficult to maneuver and unload the stored contents. In particular, a user has to lift and tilt the vehicle, which may place his/her body in an awkward position. This is especially dangerous in the case of maneuvering heavy items, which may subject the user to injuries of the back or other body regions when unloading the items from the vehicle. Other cart designs use more expensive components including actuators or other complicated components, which cost more to maintain and operate. Although these carts are effective, they are not practical for use in many residential or smaller-scale commercial applications.

As such, there is a need in the industry for a dump cart that addresses the limitations of the prior art, which provides an adjustable compartment that can be maneuvered with enhanced efficiency and reduced user effort when unloading stored items. There is a further need for the dump cart to operate without the need for actuators, machinery or other complicated components.

SUMMARY

A dump cart for use to store and transport a plurality of items on a ground surface is provided. The dump cart is configured to unload the stored items with enhanced efficiency and reduced user effort. The dump cart comprises a base frame assembly disposed on the ground surface and comprising a front end and a rear end, the base frame assembly comprising a plurality of rail members coupled together to create space between the front end and rear end, and an upper frame assembly rotatably mounted to the base frame assembly and comprising a compartment formed by a plurality of members connected together, the compartment positioned in space between the front end and rear end of the base frame assembly, wherein the compartment of the upper frame assembly is configured to rotatably adjust to a first position facing upward and away from the ground surface to load the plurality of items therein, wherein the compartment of the upper frame assembly is configured to rotatably adjust to a second position facing downward and toward the ground surface, thereby unloading the plurality of items from the compartment.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
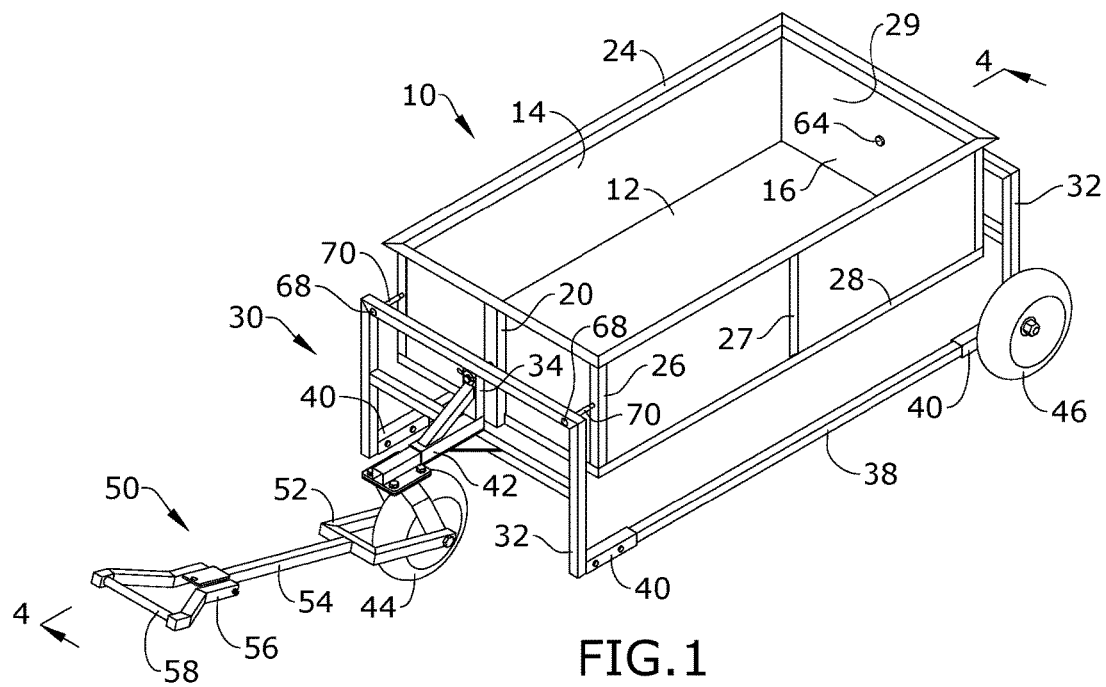
FIG. 1 depicts a perspective view of certain embodiments of the dump cart.

As depicted in FIGS. 1-5, the dump cart is configured to store and transport any items including, but not limited to, gravel, soil, grains, rocks, bricks, stones, leaves, branches, and the like. The dump cart is advantageous because it permits the loading and unloading of these items with enhanced efficiency and reduced user effort. The dump cart does not require the use of actuators, machinery or other complicated components to operate. In certain embodiments, the dump cart generally comprises upper frame assembly 10, base frame assembly 30 and handle assembly 50. In a preferred embodiment, upper frame assembly 10, base frame assembly 30 and handle assembly 50 are made from materials including, but not limited to, steel, other metals, plastic, wood or other materials.

Base frame assembly 30 is disposed on the ground and comprises a plurality of rail members connected together such as lower rails 38, end frames 32, and outer pivot post members 34. In certain embodiments, base frame assembly 30 is assembled with a pair of lower rails 38 oriented generally parallel to each other and coupled to first end frame 32 via rail connectors 40 and mechanical fasteners to form the front end of base frame assembly 30. Similarly, second end frame 32 is coupled to the pair of lower rails 38 via rail connectors 40 and mechanical fasteners to form the rear end of base frame assembly 30. Each end frame 32 comprises a series of rail members welded together or coupled together by mechanical fasteners. Each end frame 32 comprises outer pivot post member 34 located in a central portion of the frame. Each outer pivot post member 34 comprises hole 36.

In one embodiment, hitch 42 is coupled to end frame 32 by mechanical fasteners or other fastening components at the front end of base frame assembly 30. Front wheel 44 is coupled to hitch 42 by a plate and mechanical fasteners. A pair of rear wheels 46 is coupled to the rear end of base frame assembly 30.

Handle assembly 50 is coupled to front wheel 44 and comprises base fork 52, arm 54, handle grip fork 56 and handle grip 58. Base fork 52 is coupled to opposing sides of front wheel 44 at an axle using bolt 60 and a nut. Arm 54 comprises a first end coupled to base fork 52 and a second end coupled to handle grip fork 56. Handle grip 58 is coupled to handle grip fork 56 and serves as a grasping location for a user's hand. In one embodiment, handle assembly 50 is pivotably mounted to front wheel 44 so that handle grip 58 can be adjusted to a position that comfortably fits the user's hand.

Upper frame assembly 10 is rotatably mounted to base frame assembly 30 and is positioned in space between the front and rear ends of base frame assembly 30. In certain embodiments, upper frame assembly 10 comprises a plurality of members connected together to form compartment 29. Compartment 29 is formed by bottom sheet 12, long side sheets 14 and short side sheets 16, which are coupled together by an outer frame comprising bottom frame members 28, corner frame upright members 26, center frame upright members 27, top frame members 24 and inner pivot post members 20. Although compartment 29 comprises a generally cuboid-shaped member, it shall be appreciated that any alternative shaped compartment 29 may be used instead such as a pyramidal-shaped member or other shape.

Figure 4:
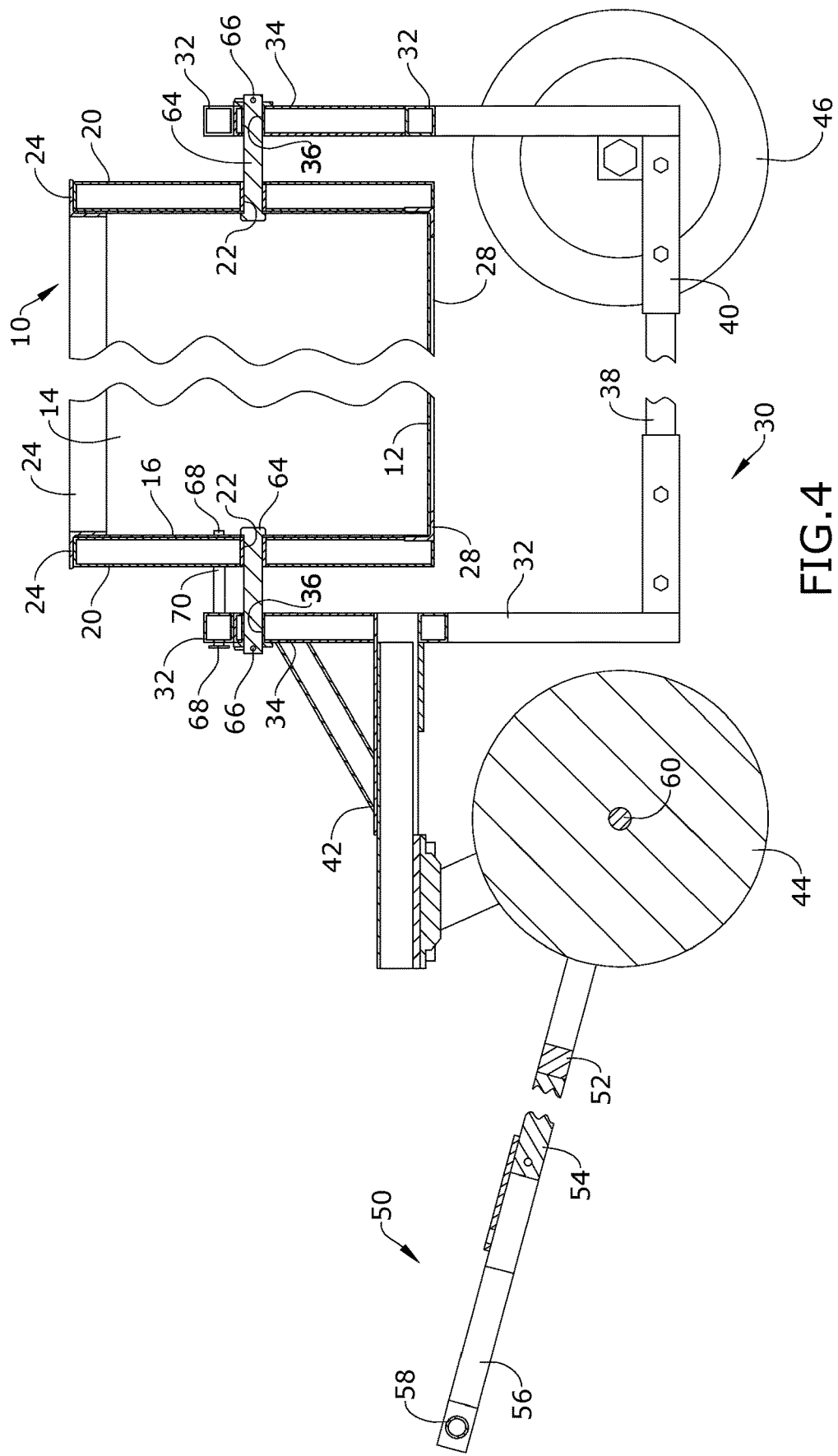
FIG. 4 depicts a section view of certain embodiments of the dump cart taken along line 4-4 in FIG. 1.
Figure 5:
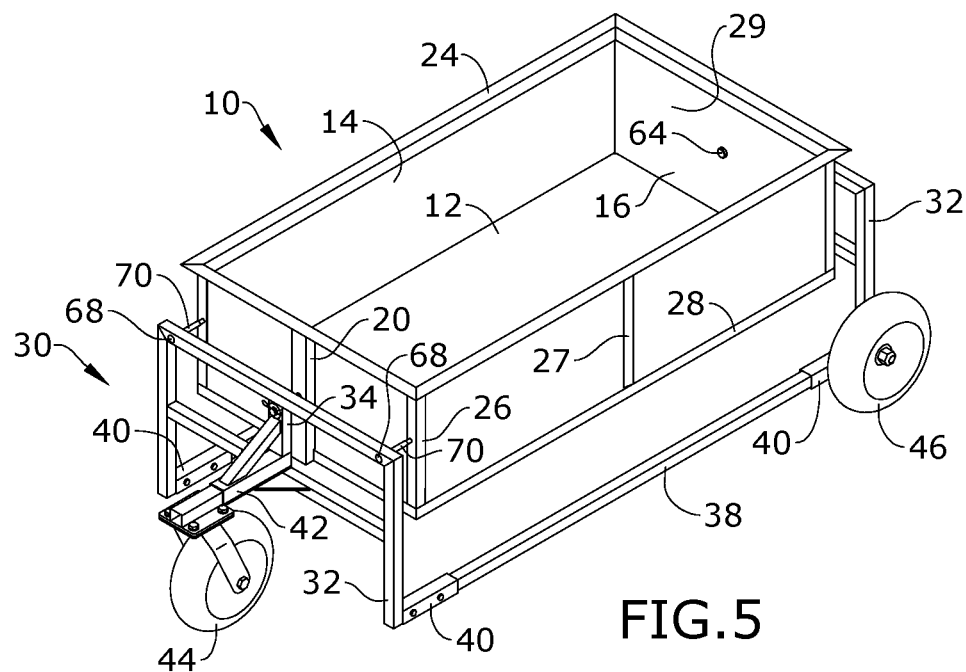
FIG. 5 depicts a perspective view of certain embodiments of the dump cart with handle assembly 50 removed to better illustrate certain components.

As depicted in FIG. 4, the front end of upper frame assembly 10 comprises first inner pivot post member 20 coupled to a corresponding pair of top and bottom frame members 24, 28. Similarly, the rear end of upper frame assembly 10 comprises second inner pivot post member 20 coupled to another corresponding pair of top and bottom frame members 24, 28. Each inner pivot post member 20 comprises hole 22, which is configured to receive clevis pin 64.

In the front end of the dump cart, clevis pin 64 is inserted through hole 36 in first outer pivot post member 34 in base frame assembly 30, hole 22 in first inner pivot post member 20 and hole 18 in short side sheet 16 of upper frame assembly 10. Clevis pin 64 is secured in place to the front end of the dump cart by cotter pin 66. In the rear end of the dump cart, clevis pin 64 is inserted through hole 36 in second outer pivot post member 34 in base frame assembly 30, hole 22 in second inner pivot post member 20 and hole 18 in short side sheet 16 of upper frame assembly 10. Clevis pin 64 is secured in place to the rear end of the dump cart by cotter pin 66.

Figure 2:
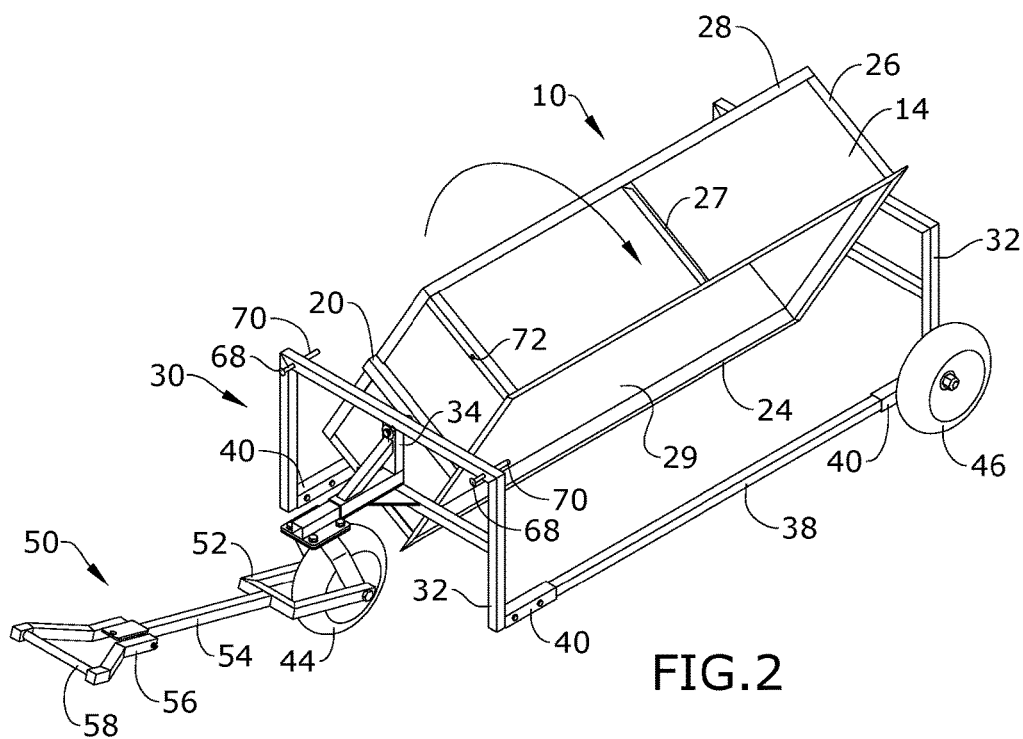
FIG. 2 depicts a perspective view of certain embodiments of the dump cart shown in use.
Figure 3:
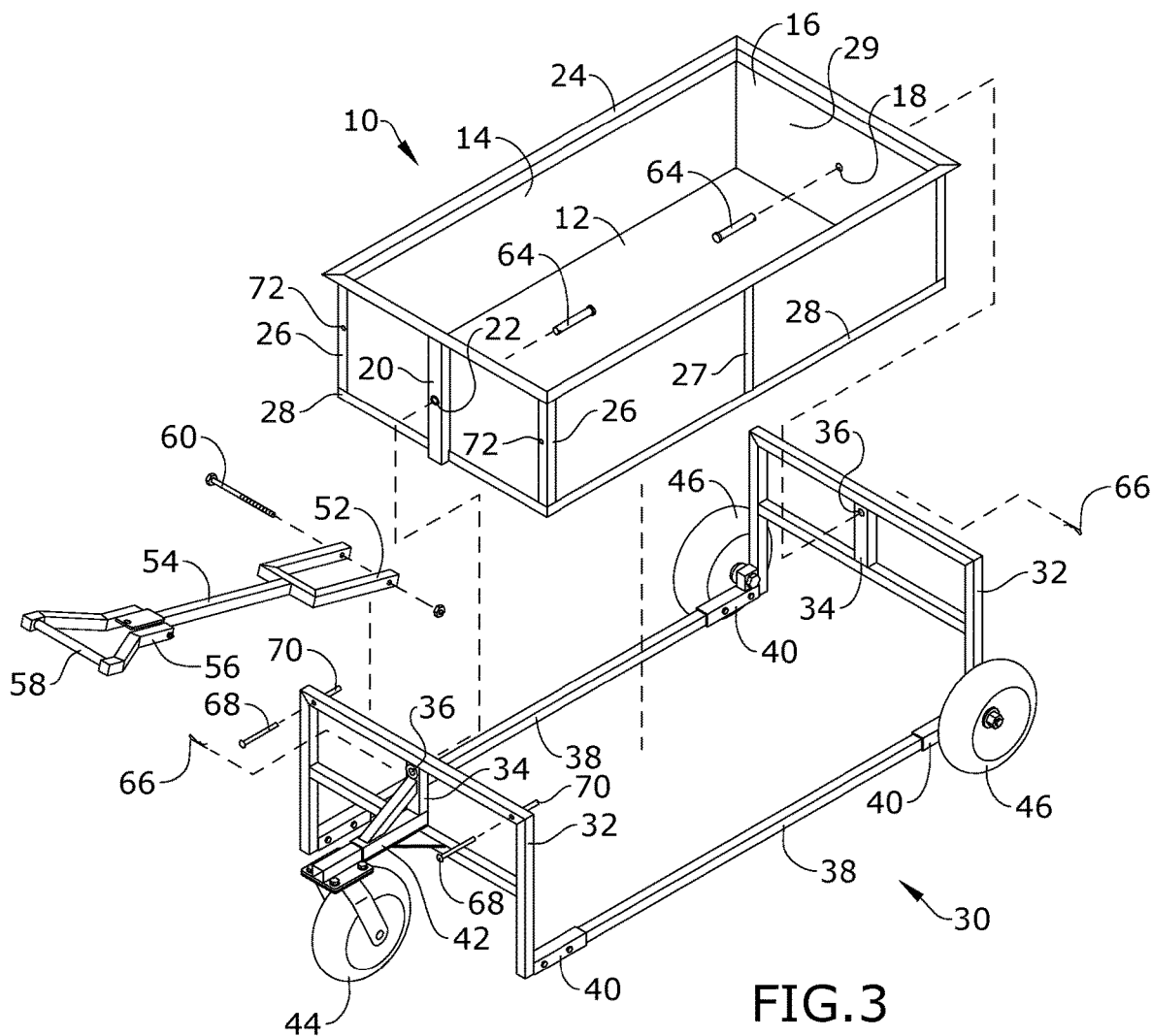
FIG. 3 depicts an exploded view of certain embodiments of the dump cart.
Figure 6:
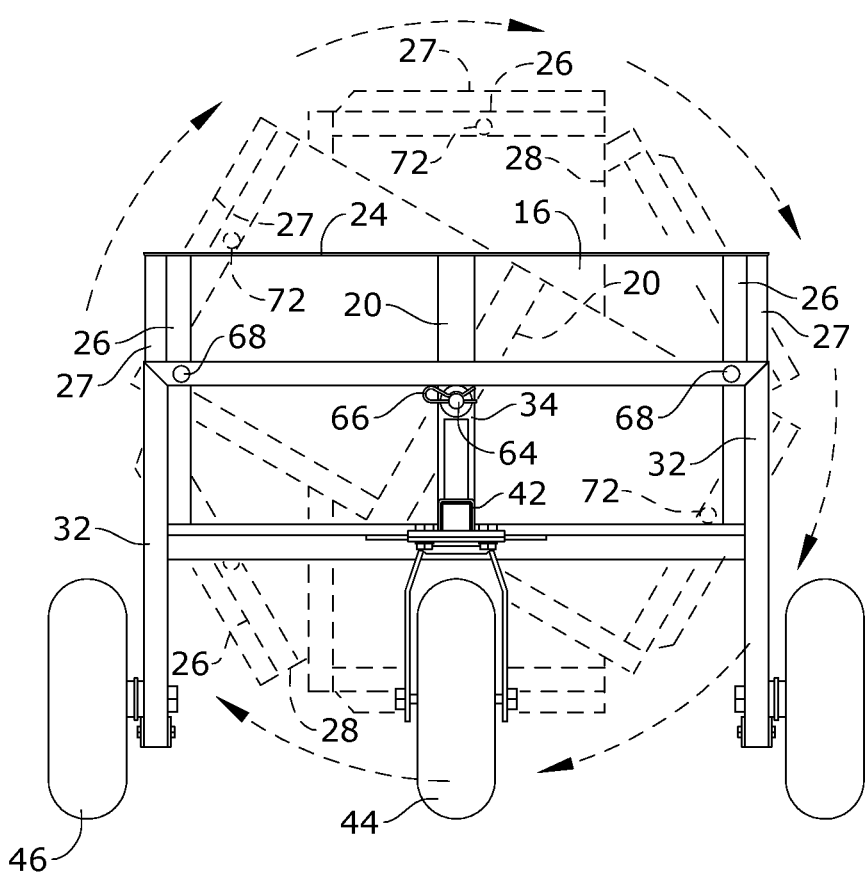
FIG. 6 depicts a front view of certain embodiments of the dump cart shown in use.

In this assembled configuration, clevis pins 64 and cotter pins 66 permit upper frame assembly 10 to rotate 360 degrees relative to base frame assembly 10 as depicted in FIGS. 2 and 6. In one embodiment, the dump cart comprises a locking mechanism to prevent rotatable movement of upper frame assembly 10 relative to base frame assembly 30. In one embodiment, the locking mechanism comprises a pair of locking pins 68, a pair of primary sleeves 70 disposed through end frame 32 and coupled to the front end of base frame assembly 30, and a pair of secondary sleeve 72 disposed through corner frame upright members 26 on the front end of upper frame assembly 10.

Upper frame assembly 10 is rotatably adjusted relative to base frame assembly 30 to a loading position with compartment 29 facing upward and away from the ground as shown in FIG. 1. Compartment 29 is locked in the loading position by inserting one or both locking pins 68 through primary sleeves 70 in base frame assembly 30 and secondary sleeves 72 in upper frame assembly 10 as depicted in FIGS. 1 and 4. In this position, any items (not shown) can be loaded into compartment 29 of upper frame assembly 10. Rotatable movement of upper frame assembly 10 is prevented due to the connection of locking pins 68 with both primary and secondary sleeves 70, 72.

The user grabs handle grip 58 and transports the dump cart along the ground to a desired dumping location. To dump the items stored in compartment 29, any locking pins 68 present are removed from secondary sleeves 72 in upper frame assembly 10. This permits a user to push the side of upper frame assembly 10. Once compartment 29 tilts slightly, the weight of the stored items along with gravity help to rotate upper frame assembly 10 with ease until compartment 29 faces downward and toward the ground in the unloading position. This empties the stored items in compartment 29 to the ground beneath the dump cart. The user pulls the dump cart away from the dumped items and restores upper frame assembly 10 to the loading position as desired.

In certain circumstances, it may be beneficial to lock upper frame assembly 10 in the unloading position with compartment 29 facing downward. In this position, one or both locking pins 68 are inserted through primary sleeves 70 in base frame assembly 30 and secondary sleeves 72 in upper frame assembly 10. In this position, bottom sheet 12 of upper frame assembly 10 can serve as a flatbed to transport items on the dump cart.

It shall be appreciated that the components of the dump cart described in several embodiments herein may comprise any alternative known materials in the field and be of any color, size and/or dimensions. It shall be appreciated that the components of the dump cart described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A dump cart for use to store and transport a plurality of items on a ground surface, the dump cart configured to unload the stored items with enhanced efficiency and reduced user effort, the dump cart comprising:
   a base frame assembly disposed on the ground surface and comprising a front end and a rear end, the base frame assembly comprising a plurality of rail members coupled together to create space between the front end and rear end; and
   an upper frame assembly rotatably mounted to the base frame assembly and comprising a compartment formed by a plurality of members connected together, the compartment positioned in space between the front end and rear end of the base frame assembly;
   wherein the compartment of the upper frame assembly is configured to rotatably adjust to a first position facing upward and away from the ground surface to load the plurality of items therein, wherein the compartment of the upper frame assembly is configured to rotatably adjust to a second position facing downward and toward the ground surface, thereby unloading the plurality of items from the compartment.

2. The dump cart of claim 1, wherein the front end of the base frame assembly comprises a first outer post member and the rear end of the base frame assembly comprises a second outer post member, wherein one of the plurality of members in a front end of the upper frame assembly comprises a first inner post member and another one of the plurality of members in a rear end of the upper frame assembly comprises a second inner post member.

3. The dump cart of claim 2, wherein the first inner post member of the upper frame assembly is rotatably mounted to the first outer post member of the base frame assembly and the second inner post member of the upper frame assembly is rotatably mounted to the second outer post member of the base frame assembly.

4. The dump cart of claim 3, wherein the first inner post member and first outer post member are coupled together by a first clevis pin and a first cotter pin, wherein the second inner post member and second outer post member are coupled together by a second clevis pin and a second cotter pin.

5. The dump cart of claim 4, further comprising a locking pin coupled to the front end of the base frame assembly and a pair of sleeves coupled to the upper frame assembly, wherein the locking pin is configured to engage with the first sleeve in the pair of sleeves to lock the compartment of the upper frame assembly in the first position, wherein the locking pin is configured to engage with the second sleeve in the pair of sleeves to lock the compartment of the upper frame assembly in the second position.

6. The dump cart of claim 5, wherein the plurality of rail members of the base frame assembly comprises a pair of lower rails coupled to both the front and rear ends of the base frame assembly, the pair of lower rails oriented generally parallel to each other.

7. The dump cart of claim 6, further comprising a hitch coupled to the front end of the base frame assembly.

8. The dump cart of claim 7, further comprising a front wheel coupled to the hitch and a pair of rear wheels coupled to the rear of the base frame assembly.

9. The dump cart of claim 8, further comprising a handle assembly coupled to the front wheel.

10. The dump cart of claim 9, wherein the handle assembly comprises a fork coupled to opposing sides of the front wheel, an arm comprising a first end coupled to the fork and a second end coupled to a grip member.

\* \* \* \* \*